United States Patent Office.

FRIEDRICH GOTTLOB HERMANN ROTHE, OF BERLIN, GERMANY, ASSIGNOR TO WERNER HELLER, OF SAME PLACE.

TREATMENT AND PREPARATION OF GYPSUM.

SPECIFICATION forming part of Letters Patent No. 455,580, dated July 7, 1891.

Application filed November 25, 1890. Serial No. 372,619. (No specimens.)

*To all whom it may concern:*

Be it known that I, FRIEDRICH GOTTLOB HERMANN ROTHE, of Berlin, in the Kingdom of Prussia and Empire of Germany, a citizen of the German Empire, have invented certain new and useful Improvements in the Processes for the Treatment and Preparation of Gypsum, of which the following is a specification.

In the methods heretofore in use for treating gypsum by burning the same under addition of alum a product was obtained which was incapable of resisting atmospheric influences. By a number of experiments in which burnt or hydrated gypsum (plaster-of-paris) was treated with borax (sodium borate) it appeared that according to the strength of the borax solution employed the setting of the plaster-of-paris was not only retarded, but when a still larger quantity of borax was used entirely prevented. It follows, therefore, that by treating plaster-of-paris with sodium borate it was impossible to obtain plaster-of-paris that was capable of resisting the influences of the atmosphere. A series of experiments in which potassium borate was used produced an entirely different result. A solution of from five to twenty per cent. of the same retards, also, the quick setting of the plaster-of-paris; but it never entirely prevents the setting of the same as the sodium borate. This property of the potassium borate—namely, the retarding of the setting—is desirable, inasmuch as the different metallic salts which are employed in the application of plaster-of-paris and for the coloring of the blocks or articles made therefrom have to be added in concentrated solution, so as to produce by their mixing and blending colored precipitates in the body of the blocks or articles.

According to the concentration of the solution of potassium borate employed the setting of the plaster-of-paris can be retarded and so controlled that it takes place within a certain fixed time. The potassium borate acts in such a manner on the calcium sulphate of the plaster and the metallic sulphates employed or their precipitates that an insoluble crystalline compound is formed, which can never be the case in the application of the sodium borate in the same manner, as sodium does not form insoluble, respectively, double combinations with the calcium sulphate.

The process which forms the subject-matter of the present invention relates to the treatment of plaster-of-paris with potassium borate so as to determine the setting time of the plaster-of-paris, and is employed in the following manner for the manufacture of artificial stone in imitation of marble, which stone is far superior to marble as regards its resistibility at atmospheric influences. For this purpose it is preferable to employ gypsum found in the older formation, with the exception of such gypsum which contains calcium carbonate and anhydride and of the fibrous kinds, as such gypsum, as was found by experiments, has the adhesiveness required for the treatment to which the same is subjected after burning the same.

The gypsum suitable for this process is used either in its natural form in the shape of blocks or after being sawed, cut, or otherwise brought into proper shape, according to the formation whence it is derived, burned to such an extent that it only contains from ten to twenty per cent. of the crystal water originally contained therein. The blocks or the articles made therefrom have thereby lost their crystalline texture. To restore the same, the articles or blocks are placed in a solution of from five to twenty per cent. of potassium borate, primarily for the purpose of preventing the too quick setting or hardening of the plaster-of-paris, and, secondarily, for producing by the succeding treatment with metallic or earthy salts a product of hard crystalline and insoluble character. A suitable solution of potassium-borate can be readily produced by neutralizing a ten-percent. solution of boric acid with potassium carbonate. The so-treated plaster-of-paris blocks or articles are now in proper condition for the coloring or hardening process, which consists in heating the blocks or articles to a temperature of from 80 to 100° centigrade, so as to expel the water not chemically bound, and then placing them into a solution of metallic salts for the coloring and hardening of the same, as these salts form, with the calcium sulphate, insoluble, respectively, sparely soluble compounds. For this purpose all the sodium salts and the chlorides and nitrates cannot be used, while on the other hand the following salts may be used, namely: potassium sulphate, aluminium sulphate, ferrous and ferric sulphate, the latter in combination with yellow and red prussiate of potassium, the single or double kalium chromate, zinc sulphate, manganese salts, and under certain circumstances copper salts.

If the plaster-of-paris blocks or articles which were treated, as before described, with a solution of potassium borate and then heated are next submerged in a solution of potassium or aluminium sulphate the blocks or articles resemble the color of natural marble, while they resemble colored marble when the articles are alternately submerged in solutions of the before-mentioned salts. After this treatment the setting and hardening of the mass takes place under a strong generation of heat in the same. If the articles thus prepared are subjected to the influence of atmospheric air, it is necessary to heat them again to a temperature of from 75° to 80° centigrade for about an hour and submerge them either into hot ozokerite or in place of the same into any other liquefied solid hydrocarbon, such as paraffine, so as to coat them with a solution of the same. In place of a liquefied hydrocarbon liquefied gums or solutions of the same may be used. In all these cases a product is obtained which is capable in a high degree of resisting atmospheric influences and which for architectural and artistic purposes is not only fully equal to natural marble, but even superior to the same, owing to its greater resistibility and strength.

Having thus described my invention, I claim as new and desire to secure by Letters Patent—

1. The process herein described of treating plaster-of-paris blocks and articles made therefrom preparatory to further treatment with metallic or earthy salts, which consists in burning the blocks or articles and then saturating them with a solution of potassium borate, substantially as set forth.

2. The process herein described of treating and coloring plaster-of-paris blocks and articles by first burning the same, then saturating the same with a solution of potassium borate, then again heating the same, so as to expel the water not chemically bound, and saturating them with solutions of such metallic salts which enter with the calcium sulphate into insoluble or sparely soluble compounds, substantially as set forth.

3. The method herein described of treating plaster-of-paris blocks and articles, which consists first in burning the same, then saturating the same with a solution of potassium borate, then heating the same, so as to expel the water not chemically bound, next saturating the same with solutions of such metallic salts which form, with the plaster-of-paris, insoluble, respectively, sparely soluble compounds, and finally saturating the surface of the same with a liquefied hydrocarbon or gum, substantially as set forth.

In witness whereof I have hereunto set my hand in presence of two witnesses.

FRIEDRICH GOTTLOB HERMANN ROTHE.

Witnesses:
CHRISTIAN FRISCH,
J. BRANDT.